(12) United States Patent  
Khoshnevis et al.

(10) Patent No.: US 10,735,985 B2  
(45) Date of Patent: Aug. 4, 2020

(54) CHANNEL STATE MEASUREMENT AND REPORTING

(71) Applicant: Sharp Laboratories of America, Inc., Camas, WA (US)

(72) Inventors: Ahmad Khoshnevis, Portland, OR (US); Shohei Yamada, Osaka (JP); Zhanping Yin, Vancouver, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 89 days.

(21) Appl. No.: 14/994,083

(22) Filed: Jan. 12, 2016

(65) Prior Publication Data

US 2016/0174096 A1    Jun. 16, 2016

Related U.S. Application Data

(63) Continuation of application No. 13/891,162, filed on May 9, 2013, now Pat. No. 9,271,279.

(51) Int. Cl.
*H04W 24/10* (2009.01)
*H04W 72/04* (2009.01)
*H04L 5/00* (2006.01)
*H04L 1/00* (2006.01)
(Continued)

(52) U.S. Cl.
CPC .............. *H04W 24/10* (2013.01); *H04L 1/00* (2013.01); *H04L 5/0048* (2013.01); *H04L 5/0057* (2013.01); *H04L 5/0078* (2013.01); *H04W 24/08* (2013.01); *H04W 72/0413* (2013.01); *H04L 5/001* (2013.01); *H04L 5/0023* (2013.01); *H04L 5/14* (2013.01)

(58) Field of Classification Search
CPC . H04W 72/0413; H04W 5/0057; H04W 1/00; H04W 5/001; H04W 5/0023; H04W 5/0048; H04W 5/0078; H04W 5/14; H04W 24/08
USPC .......... 370/252–329, 464–480; 455/452–522
See application file for complete search history.

(56) References Cited

U.S. PATENT DOCUMENTS 8,305,987 B2 * 11/2012 Fong ..................... H04L 5/0035  
370/329
8,537,911 B2 *  9/2013 Sayana ................. H04L 5/0048  
341/173
(Continued)

FOREIGN PATENT DOCUMENTS

WO         2011/115421          9/2011

OTHER PUBLICATIONS

3GPP TS 36.213 V9.1.0, Evolved Universal Terrestrial Radio Access (E-UTRA) Physical Layer Procedures, (Release 9), Mar. 2010.

(Continued)

*Primary Examiner* — Man U Phan  
(74) *Attorney, Agent, or Firm* — Austin Rapp

(57) ABSTRACT

A method for reporting uplink control information (UCI) on a user equipment (UE) is described. A second channel state information (CSI) report is transmitted. The second CSI report is computed from interference measurements only on a subframe of the CSI reference resource. A first CSI report is computed from interference measurements based on an unrestricted observation interval in time and frequency. The CSI reference resource for the second CSI report reported in uplink subframe n is defined by a valid downlink subframe n−k.

20 Claims, 9 Drawing Sheets

(51) Int. Cl.
*H04W 24/08* (2009.01)
*H04L 5/14* (2006.01)

(56) References Cited

U.S. PATENT DOCUMENTS

| | | | | |
|---|---|---|---|---|
| 8,559,879 B2* | 10/2013 | Bhushan | .............. | H04J 11/0059 |
| | | | | 455/452.1 |
| 8,825,069 B2* | 9/2014 | Koivisto | .............. | H04L 5/0048 |
| | | | | 455/452.1 |
| 8,934,350 B2* | 1/2015 | Chen | .................... | H04L 1/0026 |
| | | | | 370/241 |
| 8,989,114 B2* | 3/2015 | Kim | ...................... | H04B 7/024 |
| | | | | 370/329 |
| 9,119,209 B2* | 8/2015 | Nam | .................. | H04W 72/046 |
| 9,178,583 B2* | 11/2015 | Nam | .................... | H04B 7/0417 |
| 9,179,445 B2* | 11/2015 | Wang | .................... | H04L 5/1469 |
| 9,184,941 B2* | 11/2015 | Lee | ........................ | H04B 7/024 |
| 9,271,279 B2* | 2/2016 | Khoshnevis | ....... | H04W 72/0413 |
| 9,301,175 B2* | 3/2016 | Nam | .................... | H04W 24/08 |
| 9,363,056 B2* | 6/2016 | Chun | .................. | H04L 5/0035 |
| 9,363,775 B2* | 6/2016 | Ahn | .................... | H04L 27/2655 |
| 9,374,806 B2* | 6/2016 | Han | .................... | H04L 1/1893 |
| 9,408,201 B2* | 8/2016 | Nam | .................... | H04L 1/0003 |
| 9,438,395 B2* | 9/2016 | Kim | ........................ | H04B 7/04 |
| 9,520,973 B2* | 12/2016 | Kim | .................... | H04B 7/0667 |
| 9,603,132 B2* | 3/2017 | Han | ........................ | H04L 5/14 |
| 9,749,996 B2* | 8/2017 | Park | ...................... | H04B 7/024 |
| 9,768,930 B2* | 9/2017 | Park | .................... | H04L 5/0014 |
| 9,893,777 B2* | 2/2018 | Onggosanusi | ....... | H04B 7/0456 |
| 9,991,942 B2* | 6/2018 | Onggosanusi | ........ | H04L 1/0027 |
| 10,020,860 B2* | 7/2018 | Onggosanusi | ....... | H04B 7/0645 |
| 10,084,523 B2* | 9/2018 | Kim | .................... | H04B 7/0417 |
| 10,298,307 B2* | 5/2019 | Onggosanusi | .... | H04W 72/0406 |
| 10,374,672 B2* | 8/2019 | Onggosanusi | ....... | H04B 7/0478 |
| 2012/0076106 A1* | 3/2012 | Bhattad | ................ | H04L 5/0035 |
| | | | | 370/330 |
| 2012/0287875 A1* | 11/2012 | Kim | ...................... | H04B 7/024 |
| | | | | 370/329 |
| 2013/0077518 A1* | 3/2013 | Abe | ...................... | H04W 48/08 |
| | | | | 370/252 |
| 2013/0094384 A1* | 4/2013 | Park | .................... | H04B 7/0626 |
| | | | | 370/252 |
| 2013/0242778 A1* | 9/2013 | Geirhofer | ............. | H04L 1/0026 |
| | | | | 370/252 |
| 2013/0315197 A1* | 11/2013 | Park | .................... | H04W 72/042 |
| | | | | 370/329 |
| 2014/0038623 A1* | 2/2014 | Davydov | .............. | H04W 24/04 |
| | | | | 455/450 |
| 2014/0044040 A1* | 2/2014 | Chen | ..................... | H04W 24/02 |
| | | | | 370/328 |
| 2014/0192738 A1* | 7/2014 | Nam | ....................... | H04L 5/001 |
| | | | | 370/329 |
| 2015/0280878 A1* | 10/2015 | Lee | ....................... | H04L 5/0048 |
| | | | | 370/252 |
| 2016/0006553 A1* | 1/2016 | Kim | ...................... | H04L 1/1671 |
| | | | | 370/252 |
| 2016/0037550 A1* | 2/2016 | Barabell | .............. | H04B 17/318 |
| | | | | 455/450 |
| 2017/0117997 A1* | 4/2017 | Park | ..................... | H04L 5/0057 |
| 2017/0141832 A1* | 5/2017 | Ji | ......................... | H04B 7/0626 |
| 2017/0195031 A1* | 7/2017 | Onggosanusi | ....... | H04B 7/0626 |
| 2017/0310447 A1* | 10/2017 | Kusashima | ........... | H04L 5/0055 |
| 2017/0325216 A1* | 11/2017 | Nogami | ............ | H04W 72/0413 |
| 2018/0048447 A1* | 2/2018 | Nogami | ................ | H04L 5/0051 |
| 2018/0227106 A1* | 8/2018 | Kim | ........................ | H04L 1/00 |

OTHER PUBLICATIONS

3GPP TS 36.212 V9.2.0, Evolved Universal Terrestrial Radio Access (E-UTRA) Multiplexing and Channel Coding, (Release 9), Jun. 2010.

3GPP TS 36.211 V9.0.0, Evolved Universal Terrestrial Radio Access (E-UTRA) Physical Channels and Modulation, (Release 9), Dec. 2012.

3GPP TS 36.300 V8.5.0, Evolved Universal Terrestrial Radio Access (E-UTRA) and Evolved Universal Terrestrial Radio Access Network (E-UTRAN), (Release 8), May 2008.

3GPP TS 36.331 V9.1.0, Evolved Universal Terrestrial Radio Access (E-UTRA) Radio Resource Control (RRC), Protocol Specification, (Release 9), Dec. 2009.

"Evolved Universal Terrestrial Radio Access (E-UTRA); Physical layer procedures (Release 11)", 3GPP TS 36.213 V11.2.0, Feb. 2013, pp. 52-86.

Samsung, "CQI Reference Resource Timing for LTE-A", 3GPP TSG RAN WG1 #63bis, R1-110089, Jan. 2011, pp. 1-5.

International Search Report issued for International Patent Application No. PCT/JP2014-002461 dated May 9, 2014.

Office Action issued for U.S. Appl. No. 13/891,162 dated Nov. 25, 2014.

Office Action issued for U.S. Appl. No. 13/891,162 dated Apr. 24, 2015.

Notice of Allowance issued for U.S. Appl. No. 13/891,162 dated Feb. 5, 2016.

* cited by examiner

CHANNEL STATE MEASUREMENT AND REPORTING

CROSS-REFERENCE TO RELATED APPLICATION

This application is a continuation of U.S. Pat. No. 9,271,279, entitled "CHANNEL STATE MEASUREMENT AND REPORTING," filed on May 9, 2013, which is incorporated by reference herein, in its entirety.

TECHNICAL FIELD

The present invention relates generally to wireless communications and wireless communications-related technology. More specifically, the present invention relates to systems and methods for channel state measurement and reporting.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of cells, each of which may be serviced by a base station. A base station may be a fixed station that communicates with mobile stations.

Various signal processing techniques may be used in wireless communication systems to improve efficiency and quality of wireless communication. Benefits may be realized by improved methods for reporting uplink control information (UCI) by a wireless communication device.

DETAILED DESCRIPTION

Figure 1:
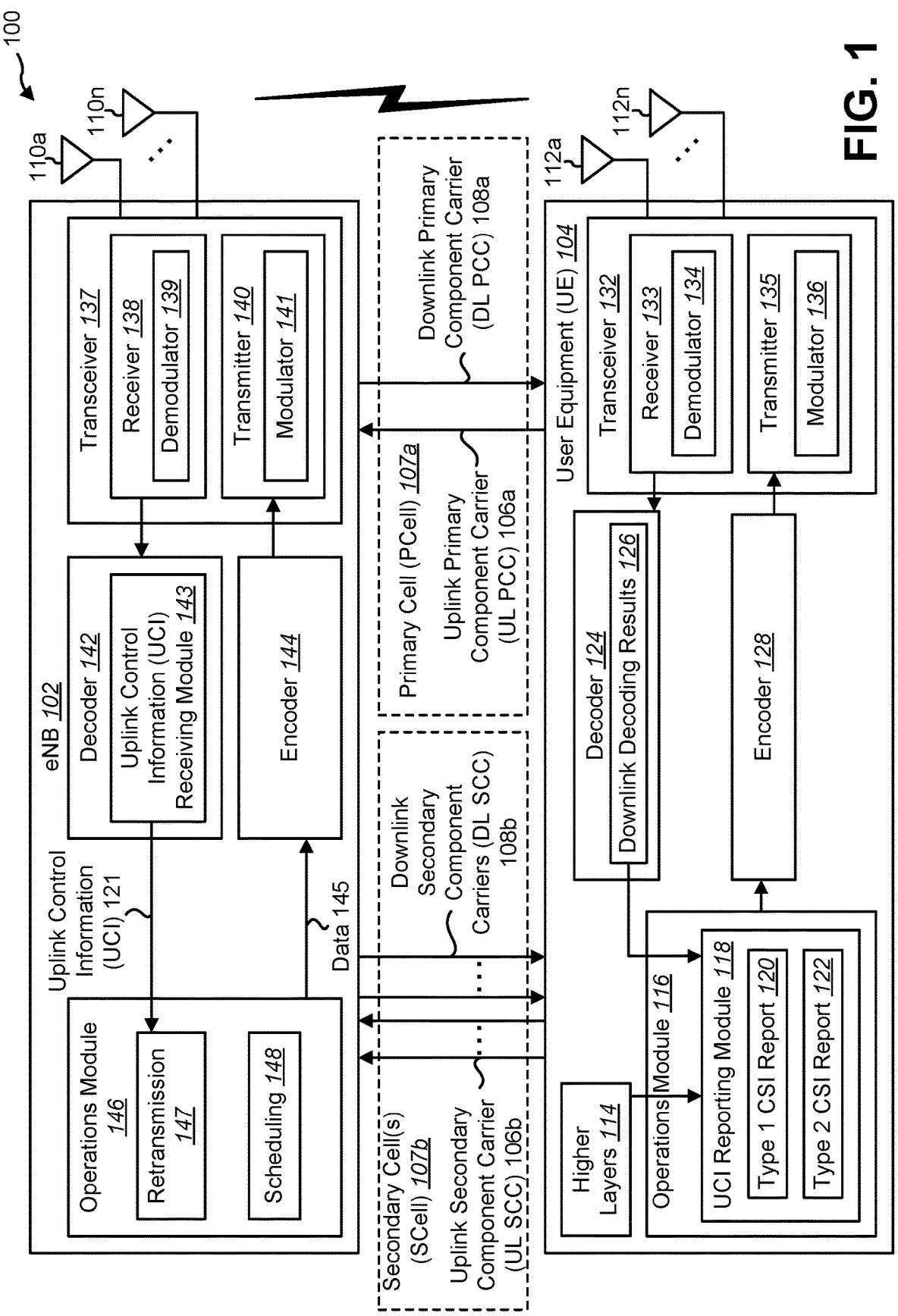
FIG. 1 is a block diagram illustrating a wireless communication system that utilizes Type 2 CSI reporting.

A method for receiving uplink control information (UCI) is described. A Type 2 channel state information (CSI) report for a CSI reference resource is received from a user equipment (UE). The Type 2 CSI report is computed from a channel measurement based on a non-zero power reference signal on a single subframe within a configured CSI-RS resource associated with a CSI process.

The single subframe may be a subframe of the CSI reference resource. The CSI reference resource for the Type 2 CSI report reported in uplink subframe n may be defined by a valid downlink subframe n-nCQI_ref. The valid downlink subframe may be in a set of subframes for a channel measurement for the Type 2 CSI report. The valid downlink subframe may be in a set of subframes in which the non-zero power reference signal is configured.

The valid downlink subframe may be in a set of subframes for Type 2 channel measurement if the set of subframes for Type 2 channel measurement is configured. The valid downlink subframe may be in a set of subframes in which the non-zero power reference signal is configured if the set of subframes for Type 2 channel measurement is not configured. The Type 2 CSI report may be a periodic CSI report. Type 2 CSI reporting may be configured in a CSI process configuration. The Type 2 CSI report may also be an aperiodic CSI report. A field in a downlink control information (DCI) may specify whether Type 2 aperiodic CSI reporting is triggered. The Type 2 CSI report may correspond to a configured CSI process.

A method for reporting uplink control information (UCI) is also described. A Type 2 channel state information (CSI) report for a CSI reference resource is generated. The Type 2 CSI report is sent to a base station. The Type 2 CSI report is computed from a channel measurement based on a non-zero power reference signal on a single subframe within a configured CSI-RS resource associated with a CSI process.

A base station configured for receiving uplink control information (UCI) is described. The base station includes a processor, memory in electronic communication with the processor and instructions stored in the memory. The instructions are executable to receive a Type 2 channel state information (CSI) report for a CSI reference resource from a user equipment (UE). The Type 2 CSI report is computed from a channel measurement based on a non-zero power reference signal on a single subframe within a configured CSI-RS resource associated with a CSI process.

A user equipment (UE) configured for reporting uplink control information (UCI) is also described. The UE includes a processor, memory in electronic communication with the processor and instructions stored in the memory. The instructions are executable to generate a Type 2 channel state information (CSI) report for a CSI reference resource. The instructions are also executable to send the Type 2 CSI report to a base station. The Type 2 CSI report is computed from a channel measurement based on a non-zero power reference signal on a single subframe within a configured CSI-RS resource associated with a CSI process.

The 3rd Generation Partnership Project, also referred to as "3GPP," is a collaboration agreement that aims to define globally applicable technical specifications and technical reports for third and fourth generation wireless communication systems. The 3GPP may define specifications for the next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE and LTE-Advanced standards (e.g., Release-8, Release-9, Release-10 and Release-11). However, the scope of the present disclosure should not be limited in this regard. At least some aspects of the systems and methods disclosed herein may be utilized in other types of wireless communication systems.

The term "simultaneous" may be used herein to denote a situation where two or more events occur in overlapping time frames. In other words, two "simultaneous" events may overlap in time to some extent, but are not necessarily of the same duration. Furthermore, simultaneous events may or may not begin or end at the same time.

FIG. 1 is a block diagram illustrating a wireless communication system 100 that utilizes Type 2 CSI reporting. Downlink and uplink transmissions are organized into radio frames. Two radio frame structures are supported: Type 1 (applicable to frequency division duplex (FDD)) and Type 2 (applicable to time division duplex (TDD)). Type 2 CSI reporting is defined as channel measurements for a CSI report that are based on only either or both of a channel measurement in a single subframe and an interference measurement in a single subframe. The details describing Type 2 CSI reporting are given below. In contrast, Type 1 CSI reporting is defined as channel measurements for a CSI report that are based on unrestricted observations or measurements in time and/or frequency. Thus, Type 1 CSI reporting may provide a CSI report that includes channel measurements for the reference signal over multiple contiguous or non-contiguous subframes.

It is possible that some of the subframes measured for Type 1 CSI reporting may not carry a reference signal. If a UE 104 measures the channel in multiple subframes, some of which do not carry a reference signal, and then includes both measurements in generating a report (such as a weighted average of measurements), the generated report may include erroneous measurements. Thus, there is a need for Type 2 CSI reporting to provide more accurate and reliable CSI reports to an eNB 102. Even though a UE may not know whether a subframe is an uplink, downlink or special subframe, the resulting report may be useful to the eNB, because the eNB is aware of whether a CSI report is generated based on a measurement on a downlink subframe, an uplink subframe or a special subframe.

An eNB 102 may be in wireless communication with one or more user equipments (UEs) 104. An eNB 102 may also be referred to as an access point, a Node B, an evolved Node B, a base station or some other terminology. Likewise, a user equipment (UE) 104 may also be referred to as a mobile station, a subscriber station, an access terminal, a remote station, a user terminal, a terminal, a handset, a subscriber unit, a wireless communication device, or some other terminology.

Communication between a user equipment (UE) 104 and an eNB 102 may be accomplished using transmissions over a wireless link, including an uplink and a downlink. The uplink refers to communications sent from a user equipment (UE) 104 to an eNB 102. The downlink refers to communications sent from an eNB 102 to a user equipment (UE) 104. The communication link may be established using a single-input and single-output (SISO), multiple-input and single-output (MISO), single-input and multiple-output (SIMO) or a multiple-input and multiple-output (MIMO) system. A MIMO system may include both a transmitter and a receiver equipped with multiple transmit and receive antennas. Thus, an eNB 102 may have multiple antennas 110a-n and a user equipment (UE) 104 may have multiple antennas 112a-n. In this way, the eNB 102 and the user equipment (UE) 104 may each operate as either a transmitter or a receiver in a MIMO system. One benefit of a MIMO system is improved performance if the additional dimensionalities created by the multiple transmit and receive antennas are utilized.

The user equipment (UE) 104 communicates with an eNB 102 using one or more antenna ports, which may be realized by one or more physical antennas 112a-n. The user equipment (UE) 104 may include a transceiver 132, a decoder 124, an encoder 128 and an operations module 116. The transceiver 132 may include a receiver 133 and a transmitter 135. The receiver 133 may receive signals from the eNB 102 using one or more antennas 112a-n. For example, the receiver 133 may receive and demodulate received signals using a demodulator 134. The transmitter 135 may transmit signals to the eNB 102 using one or more antenna ports, which may be realized by one or more physical antennas 112a-n. For example, the transmitter 135 may modulate signals using a modulator 136 and transmit the modulated signals.

The receiver 133 may provide a demodulated signal to the decoder 124. The user equipment (UE) 104 may use the decoder 124 to decode signals and make downlink decoding results 126. The downlink decoding results 126 may indicate whether data was received correctly. For example, the downlink decoding results 126 may indicate whether a packet was correctly or erroneously received (i.e., positive acknowledgement, negative acknowledgement or discontinuous transmission (no signal)).

The operations module 116 may be a software and/or hardware module used to control user equipment (UE) 104 communications. For example, the operations module 116 may determine when the user equipment (UE) 104 requires resources to communicate with an eNB 102.

In 3$^{rd}$ Generation Partnership Project (3GPP) Long Term Evolution (LTE)-Advanced, additional control feedback will have to be sent on control channels to accommodate MIMO and carrier aggregation. Carrier aggregation refers to transmitting data on multiple component carriers (CCs) (or cells) that are contiguously or separately located. In carrier aggregation (CA), only one uplink component carrier (CC) (or cell) (i.e., PCC or PCell) may be utilized for transmission using the physical uplink control channel (PUCCH). A component carrier (CC) is a carrier frequency to which cells belong.

To select a suitable modulation scheme and channel coding rate, the transmitter needs information about the radio-link between the transmitter and the receiver (i.e., channel state information (CSI)). The CSI may also be used for channel-dependent scheduling. In an FDD system, only the receiver can accurately and reliably estimate the radio-link channel condition. For downlink transmissions, the base station (e.g., an eNode B, eNB 102, transmission point) sends a signal to the UE 104 that includes time and frequency resources as well as sequence information, antenna port information and transmit power. In release 11 of the 3GPP specification, one reference signal that is used for channel measurement is the CSI-RS.

The user equipment (UE) 104 may transmit uplink control information (UCI) to an eNB 102 on the uplink. The uplink control information (UCI) may include one or more channel state information (CSI) reports. A CSI report may be a Type 1 CSI report 120 or a Type 2 CSI report 122. A channel state information (CSI) report may include a channel quality indicator (CQI), a precoder matrix indicator (PMI), and/or a rank indicator (RI). The rank indicator (RI) provides a recommendation on the number of spatial layers that should preferably be used for downlink transmission. The precoder matrix indicator (PMI) indicates the precoder matrix that should be used for downlink transmission. The precoder matrix may be determined by considering the number of supported layers indicated in the rank indicator (RI). The CQI indicates the highest modulation and coding scheme (MCS) that can be used for transmission of the PDSCH with a block error rate no larger than 10%.

A CSI report may be transmitted to an eNB 102 using aperiodic reporting and/or periodic reporting. Aperiodic CSI reports are sent by a UE 104 when explicitly requested (by a field in an uplink DCI (downlink control information)). Periodic CSI reports are configured by the eNB 102 (which may also be referred to as the network) to be sent by the UE 104 periodically.

The CQI indices and their interpretations are given in Table 1 below.

TABLE 1

| CQI index | Modulation | Code rate x 1024 | Efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Based on an unrestricted observation interval in time and frequency, the UE 104 may be required to derive, for each CQI value reported in uplink subframe n, the highest CQI index between 1 and 15 which satisfies the condition that a single physical downlink shared channel (PDSCH) transport block with a combination of modulation scheme and transport block size corresponding to the CQI index and occupying a group of downlink physical resource blocks (termed the CSI reference resource) could be received with a transport block error probability not exceeding 0.1. If CQI index 1 does not satisfy this condition, the UE 104 may instead use CQI index 0.

A UE 104 in transmission mode 10 can be configured with one or more CSI processes per serving cell by higher layers 114. Each CSI process may be associated with a CSI-RS resource and a CSI interference measurement (CSI-IM) resource. A CSI reported by the UE 104 corresponds to a CSI process configured by higher layers 114.

In the frequency domain, the CSI reference resource is defined by the group of downlink physical resource blocks corresponding to the band to which the CQI value relates. In the time domain, for a UE 104 configured in transmission mode 1-9 or in transmission mode 10 with a single configured CSI process for the serving cell, the CSI reference resource is defined by a single downlink subframe $n-n_{CQI\_ref}$. For periodic CSI reporting, $n_{CQI\_ref}$ is the smallest value greater than or equal to 4 such that subframe $n-n_{CQI\_ref}$ corresponds to a valid downlink subframe. For aperiodic CSI reporting, $n_{CQI\_ref}$ is such that the reference resource is in the same valid downlink subframe as the corresponding CSI request in an uplink DCI format. For aperiodic CSI reporting, $n_{CQI\_ref}$ is equal to 4 and the downlink subframe $n-n_{CQI\_ref}$ corresponds to a valid downlink subframe, where the downlink subframe $n-n_{CQI\_ref}$ is received after the subframe with the corresponding CSI request in a random access response grant.

For a UE 104 configured in transmission mode 10 with multiple configured CSI processes for the serving cell, the CSI reference resource for a given CSI process may be defined by a single downlink subframe $n-n_{CQI\_ref}$. For FDD and periodic or aperiodic CSI reporting, $n_{CQI\_ref}$ is the smallest value greater than or equal to 5 such that the downlink subframe $n-n_{CQI\_ref}$ corresponds to a valid downlink subframe. For FDD and aperiodic CSI reporting, $n_{CQI\_ref}$ is equal to 5 and the downlink subframe $n-n_{CQI\_ref}$ corresponds to a valid downlink subframe, where the downlink subframe $n-n_{CQI\_ref}$ is received after the subframe with the corresponding CSI request in a random access response grant.

For TDD with two or three configured CSI processes and aperiodic or periodic CSI reporting, $n_{CQI\_ref}$ is the smallest value greater than or equal to 4 such that the downlink subframe $n-n_{CQI\_ref}$ corresponds to a valid downlink subframe. For TDD with two or three configured CSI processes and aperiodic reporting, $n_{CQI\_ref}$ is equal to 4 and the downlink subframe $n-n_{CQI\_ref}$ corresponds to a valid downlink subframe, where the downlink subframe $n-n_{CQI\_ref}$ is received after the subframe with the corresponding CSI request in a random access response grant.

For TDD with four configured CSI processes and periodic or aperiodic CSI reporting, $n_{CQI\_ref}$ is the smallest value greater than or equal to 4 such that the downlink subframe $n-n_{CQI\_ref}$ corresponds to a valid downlink subframe. For TDD with four configured CSI processes and aperiodic CSI reporting, $n_{CQI\_ref}$ is equal to 5 and the downlink subframe $n-n_{CQI\_ref}$ corresponds to a valid downlink subframe, where the downlink subframe $n-n_{CQI\_ref}$ is received after the subframe with the corresponding CSI request in a random access response grant.

Upon decoding in subframe n either an uplink DCI (downlink control information) or a random access response grant, the UE 104 may perform aperiodic CSI reporting using the physical uplink shared channel (PUSCH) in subframe n+k on a serving cell, if the respective CSI request field is set to trigger a report and is not reserved. If the CSI request field is 1 bit, the CSI request field is set to 1 and the UE 104 is configured in transmission mode 1-9, a report is triggered for the serving cell. If the CSI request field is 1 bit and the UE 104 is configured in transmission mode 10, a report is triggered for a set of CSI process(es) for the serving cell corresponding to the higher layer 114 configured set of CSI process(es) associated with the value of the CSI request field in Table 1 below.

TABLE 2

| Value of CSI request field | Description |
|---|---|
| '00' | No aperiodic CSI report is triggered |
| '01' | Aperiodic CSI report is triggered for serving cell |
| '10' | Aperiodic CSI report is triggered for a $1^{st}$ set of serving cells configured by higher layers |
| '11' | Aperiodic CSI report is triggered for a $2^{nd}$ set of serving cells configured by higher layers |

If the CSI request field size is 2 bits and the UE 104 is configured in transmission mode 1-9 for all serving cells, a report is triggered according to the value in Table 2 above corresponding to aperiodic CSI reporting. If the CSI request field size is 2 bits and the UE 104 is configured in transmission mode 10 for at least one serving cell, a report is triggered according to the value in Table 3 below corresponding to aperiodic CSI reporting. For a given serving cell, if the UE 104 is configured in transmission modes 1-9, the "CSI process" in Table 3 refers to the aperiodic CSI configured for the UE 104 on the given serving cell. A UE 104 is not expected to be configured by higher layers 114 with more than 5 CSI processes in each of the $1^{st}$ and $2^{nd}$ set of CSI process(es) in Table 3.

TABLE 3

| Value of CSI request field | Description |
|---|---|
| '00' | No aperiodic CSI report is triggered |
| '01' | Aperiodic CSI report is triggered for a set of CSI process(es) configured by higher layers for serving cell |
| '10' | Aperiodic CSI report is triggered for a $1^{st}$ set of CSI process(es) configured by higher layers |
| '11' | Aperiodic CSI report is triggered for a $2^{nd}$ set of CSI process(es) configured by higher layers |

When the CSI request field from an uplink DCI format is set to trigger a report, for FDD k=4, and for TDD UL/DL configuration 1-6, k is given from Table 4 below. TDD UL/DL configuration is a configuration that indicates whether a subframe is uplink, downlink or a special subframe. For TDD UL/DL configuration 0, if the most significant bit (MSB) of the uplink index is set to 1 and the least significant bit (LSB) of the uplink index is set to 0, k is given in Table 5 below.

TABLE 4

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | 4 | 6 | | | |
| 1 | | | 6 | | 4 | | 6 | | | 4 |
| 2 | | | | 4 | | | | | 4 | |
| 3 | | 4 | | | | | | | 4 | 4 |
| 4 | | | | | | | | | 4 | 4 |
| 5 | | | | | | | | | 4 | |
| 6 | | 7 | 7 | | | 7 | 7 | | | 5 |

TABLE 5

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | | 9 | 6 | | | 9 | 6 | | | |
| 1 | | | 2 | | 3 | | 2 | | | 3 |
| 6 | | 5 | 5 | | | | 6 | 6 | | 8 |

If the most significant bit (MSB) of the uplink index is set to 0 and the least significant bit (LSB) of the uplink index is set to 1, k is equal to 7. If both the most significant bit (MSB) and the least significant bit (LSB) of the uplink index are set to 1, k is given in Table 4. For TDD, if a UE 104 is configured with more than one serving cell and if the UL/DL configurations of at least two serving cells are different, the TDD UL/DL Configuration given in Table 4 refers to the UL-reference UL/DL configuration.

When the CSI request field from a Random Access Response Grant is set to trigger a report and is not reserved, k is equal to $k_1$ if the uplink delay field is set to zero. The UE 104 may postpone aperiodic CSI reporting to the next available uplink subframe if the UL delay field is set to 1.

A UE 104 may be semi-statically configured by higher layers 114 to periodically feedback different CSI components (CQI, PMI, PTI, and/or RI) on the physical uplink control channel (PUCCH). A UE 104 in transmission mode 10 can be configured by higher layers 114 for multiple periodic CSI reports corresponding to one or more CSI processes per serving cell on the PUCCH.

The information element CQI-ReportConfig given below is used to specify the CQI reporting configuration.

```
                    CQI-ReportConfig Information Element

CQI-ReportConfig-r10 ::=SEQUENCE {
    cqi-ReportAperiodic-r10         CQI-ReportAperiodic-r10        OPTIONAL, -
- Need ON
      nomPDSCH-RS-EPRE-Offset             INTEGER (−1..6),
    cqi-ReportPeriodic-r10          CQI-ReportPeriodic-r10         OPTIONAL, -
- Need ON
    pmi-RI-Report-r9                ENUMERATED {setup}             OPTIONAL, -
- Cond PMIRIPCell
    csi-SubframePatternConfig-r10       CHOICE {
      release                           NULL,
      setup                             SEQUENCE {
        csi-MeasSubframeSet1-r10            MeasSubframePattern-r10,
        csi-MeasSubframeSet2-r10            MeasSubframePattern-r10
      }
    }                                                           OPTIONAL -- Need
ON
}
```

The "MeasSubframePattern-r10" is a bit map of size 20, 40, 60, or 70 bits. Each bit in the bit map represents a subframe. The value of each bit determines whether that subframe belongs to the measurement set or not. For example, 1 may indicate inclusion and 0 may indicate exclusion.

The uplink control information (UCI) (such as a CSI report) may be generated by an uplink control information (UCI) reporting module 118 and transferred to an encoder 128. The encoder 128 may then provide the uplink control information (UCI) to the transmitter 135.

The time and frequency resources may be quantized to create a grid known as the time-frequency grid. In the time domain, 10 milliseconds (ms) is referred to as one radio frame. One radio frame may include 10 subframes, each with a duration of 1 ms, which is the duration of transmission in the uplink and/or downlink. Every subframe may be divided into two slots, each with a duration of 0.5 ms. Each slot may be divided into 7 symbols. The frequency domain may be divided into bands with a 15 kilohertz (kHz) width, referred to as a subcarrier. One resource element has a duration of one symbol in the time domain and the bandwidth of one subcarrier in the frequency domain.

The minimum amount of resource that can be allocated for the transmission of information in the uplink or downlink in any given subframe is two resource blocks (RBs), with one RB at each slot. One RB has a duration of 0.5 ms (7 symbols or one slot) in the time domain and a bandwidth of 12 subcarriers (180 kHz) in the frequency domain. At any given subframe, a maximum of two RBs (one RB at each slot) can be used by a given user equipment (UE) 104 for the transmission of uplink control information (UCI) in the physical uplink control channel (PUCCH).

In LTE Release-8, only one uplink component carrier (CC) 106 or serving cell 107 and one downlink component carrier (CC) 108 or serving cell 107 can be used for transmission to and reception from each user equipment (UE) 104.

In 3GPP Long Term Evolution (LTE) Release-10 (LTE-A or Advanced EUTRAN), carrier aggregation was introduced. Carrier aggregation may also be referred to as cell aggregation. Carrier aggregation is supported in both the uplink and the downlink with up to five component carriers (CCs) 106, 108. Each component carrier (CC) 106, 108 or cell 107 may have a transmission bandwidth of up to 110 resource blocks (i.e., up to 20 megahertz (MHz)). In carrier aggregation, two or more component carriers (CCs) 106, 108 are aggregated to support wider transmission bandwidths up to one hundred megahertz (MHz). A user equipment (UE) 104 may simultaneously receive and/or transmit on one or multiple component carriers (CCs) 106, 108, depending on the capabilities of the user equipment (UE) 104.

A user equipment (UE) 104 may communicate with an eNB 102 using multiple component carriers (CCs) 108 at the same time. For example, a user equipment (UE) 104 may communicate with an eNB 102 using a primary cell (PCell) 107a while simultaneously communicating with the eNB 102 using secondary cell(s) (SCell) 107b. Similarly, an eNB 102 may communicate with a user equipment (UE) 104 using multiple component carriers (CCs) 108 at the same time. For example, an eNB 102 may communicate with a user equipment (UE) 104 using a primary cell (PCell) 107a while simultaneously communicating with the user equipment (UE) 104 using secondary cell(s) (SCell) 107b.

An eNB 102 may include a transceiver 137 that includes a receiver 138 and a transmitter 140. An eNB 102 may additionally include a decoder 142, an encoder 144 and an operations module 146. An eNB 102 may receive uplink control information (UCI) 121 using its one or more antenna ports, which may be realized by one or more physical antennas 110a-n, and its receiver 138. The receiver 138 may use the demodulator 139 to demodulate the uplink control information (UCI) 121.

The decoder 142 may include an uplink control information (UCI) receiving module 143. An eNB 102 may use the uplink control information (UCI) receiving module 143 to decode and interpret the uplink control information (UCI) 121 received by the eNB 102. The eNB 102 may use the decoded uplink control information (UCI) 121 to perform certain operations, such as retransmit one or more packets based on scheduled communication resources for the user equipment (UE) 104.

The operations module 146 may include a retransmission module 147 and a scheduling module 148. The retransmission module 147 may determine which packets to retransmit (if any) based on the uplink control information (UCI) 121. The scheduling module 148 may be used by the eNB 102 to schedule communication resources (e.g., bandwidth, time slots, frequency channels, spatial channels, etc.). The scheduling module 148 may use the uplink control information (UCI) 121 to determine whether (and when) to schedule communication resources for the user equipment (UE) 104.

The operations module 146 may provide data 145 to the encoder 144. For example, the data 145 may include packets for retransmission and/or a scheduling grant for the user equipment (UE) 104. The encoder 144 may encode the data 145, which may then be provided to the transmitter 140. The transmitter 140 may modulate the encoded data using the modulator 141. The transmitter 140 may transmit the modulated data to the user equipment (UE) 104 using one or more antenna ports, which may be realized by the one or more physical antennas 110a-n.

When carrier aggregation is configured, a user equipment (UE) 104 may have only one radio resource control (RRC) connection with the network. At the radio resource control (RRC) connection establishment/re-establishment/handover, one serving cell 107 (i.e., the primary cell (PCell) 107a) provides the non-access stratum (NAS) mobility information (e.g., Tracking Area Identity (TAI)) and the security input.

In the downlink, the component carrier (CC) 108 corresponding to the primary cell (PCell) 107a is the downlink primary component carrier (DL PCC) 108a. In the uplink, the component carrier (CC) 106 corresponding to the primary cell (PCell) 107a is the uplink primary component carrier (UL PCC) 106a. Depending on the capabilities of the user equipment (UE) 104, one or more secondary component carriers (SCC) 106b, 108b or secondary cells (SCell) 107b may be configured to form a set of serving cells with the primary cell (PCell) 107a. In the downlink, the component carrier (CC) 108 corresponding to the secondary cell (SCell) 107b is the downlink secondary component carrier (DL SCC) 108b. In the uplink, the component carrier (CC) 106 corresponding to the secondary cell (SCell) 107b is the uplink secondary component carrier (UL SCC) 106b. The number of downlink component carriers (CCs) 108 may be different from the number of uplink component carriers (CCs) 106 because multiple cells may share one uplink component carrier (CC) 106.

If carrier aggregation is configured, a user equipment (UE) 104 may have multiple serving cells: a primary cell (PCell) 107a and one or more secondary cells (SCell) 107b. From a network perspective, a serving cell 107 may be used as the primary cell (PCell) 107a by one user equipment (UE) 104 and used as a secondary cell (SCell) 107b by another user equipment (UE) 104. If carrier aggregation is not configured, a primary cell (PCell) 107a operates a single serving cell. There may be one or more secondary cells (SCell) 107b in addition to the primary cell (PCell) 107a if carrier aggregation is configured. One benefit of using carrier aggregation is that additional downlink and/or uplink data may be transmitted. As a result of the additional downlink data, additional uplink control information (UCI) may be needed.

A UE 104 is in RRC_CONNECTED state when an RRC (radio resource control) connection has been established. If no RRC connection has been established, the UE 104 is in RRC_IDLE state.

A number of spatial channels may be available on each serving cell 107 by using multiple antenna ports at a transmitter and a receiver. Therefore, multiple codewords (up to two codewords) may be transmitted simultaneously.

A channel state information (CSI) report may be used to inform the eNB 102 to adjust the transmission rate (modulation scheme and coding rate) dynamically based on the existing channel conditions at the user equipment (UE) 104. For example, if a channel state information (CSI) report indicates a good channel quality at the user equipment (UE) 104, the eNB 102 may select a higher order modulation and coding rate, thereby achieving a higher transmission rate for the downlink transmission of data on the physical downlink shared channel (PDSCH). If a channel state information (CSI) report indicates a poor channel quality at the user equipment (UE) 104, the eNB 102 may select a lower order modulation and coding rate, thereby achieving higher reliability for the transmission.

In Type 1 CSI measurement/reporting (the existing measurement used in Release 11 of the 3GPP specification), a UE 104 in transmission mode 10 may derive the channel measurements for computing the CQI value reported in uplink subframe n (that corresponds to a CSI process) based on only the non-zero power CSI-RS within a configured CSI-RS resource associated with the CSI process. However, it is possible that subframe n carries the CSI-RS in radio frame k and does not carry the CSI-RS in radio frame k+m. If the UE 104 measures the channel in both subframes and includes both measurements in generating a report (such as a weighted averaging of measurements), then the generated report includes erroneous measurements.

The use of Type 2 CSI measurement/reporting provides meaningful and reliable reports to the eNB 102 regardless of whether the CSI-RS is transmitted on the subframe corresponding to the CSI report. Furthermore, since the eNB 102 schedules the transmission of the CSI-RS, the eNB 102 is aware of whether the reported measurement is a valid channel state measurement or simply an interference measurement.

A UE 104 may be configured with multiple CSI processes. A UE 104 in transmission mode 10 can be configured with one or more CSI processes per serving cell by higher layers 114. Each CSI process may be associated with a CSI-RS resource (including time and frequency resources allocated for transmission of CSI-RS, a CSI-RS sequence, an antenna port at which the CSI-RS is transmitted and the transmit power of the CSI-RS) and with a CSI-interference measurement (CSI-IM) resource (including the time and frequency resources on which the UE should perform interference measurement). Each CSI process is also associated with a reporting configuration which includes configurations for periodic and aperiodic reporting such as the CQI format (sub-band or wideband CQI), the resource indices (S1 or S2), the periodicity of periodic reports, the subframe offset associated with the periodic reports, etc. For simplicity, only one CSI process is considered, with the configured CSI resource and periodic and aperiodic CSI reporting configurations.

In one configuration, the same CSI process may be used for both Type 1 measurement/reporting and Type 2 measurement/reporting. The measurement configuration may be semi-static, dynamic or periodic. If the measurement configuration is semi-static, this enables Type 2 measurement/reporting in a CSI process. A set of subframes for Type 2 channel measurement may also be configured.

If the measurement configuration is dynamic, triggering may be used for Type 2 aperiodic CSI reporting. In this configuration, a field (which may be one bit or two bits) in the uplink DCI (e.g., DCI format 0 or DCI format 4) may specify whether Type 2 aperiodic reporting is triggered.

Downlink control information may be sent in packets of pre-specified length, known as DCI. The DCI may be carried by the PDCCH or the enhanced physical downlink control channel (EPDCCH). Das may carry different information. For example, one DCI may be used to inform UEs 104 about downlink resource allocation and another DCI may be used to inform a specific UE 104 about uplink resource allocation. Depending on the functionality of a DCI, different Das may have different lengths. Different Das may be distinguished by the way they are formatted and coded, which is referred to as the DCI format. A DCI may be used to transport downlink or uplink scheduling information, requests for periodic CQI reports, notifications of multicast control channel (MCCH) changes or uplink power control commands for one cell and one Radio Network Temporary Identifier (RNTI). The RNTI may be implicitly encoded in the cyclic redundancy check (CRC).

An uplink DCI allocates resources for uplink transmission. An uplink DCI may also be referred to as an uplink grant (e.g., DCI format 0/4). A downlink DCI allocates resources for downlink transmission. A downlink DCI may also be referred to as a downlink grant (e.g., DCI format 1/1A/2/2A/2B/2C/2D).

A bit field in the DCI indicates which reports of a type (i.e., Type 1 and/or Type 2) should be included in the UCI. The bit field may include multiple bits (e.g., 2 bits for a set of CSI reports corresponding to one or more CSI processes, 1 bit for a type 2 trigger, etc.). If Type 1 aperiodic CSI reporting is triggered, the UE 104 may be required to include a Type 1 CSI report 120 in the UCI. If Type 2 aperiodic CSI reporting is triggered, the UE 104 may be required to include a specified number of Type 2 CSI reports 122 (predefined or signaled by RRC) and a Type 1 CSI report 120 for each CSI process within the set of CSI processes with corresponding CSI reports include in the UCI.

If the measurement configuration is periodic, the UE 104 may periodically generate and send CSI reports to the eNB 102. For Type 1 periodic CSI reporting, the periodicity and relative reporting offset for the subframe set S1 and the periodicity and relative reporting offset for the subframe set S2 are configured for each CSI process. For Type 2 periodic CSI reporting, additional periodicity and relative reporting offset is configured for each CSI process.

In another configuration, two CSI processes are used for Type 1 measurement/reporting and Type 2 measurement/reporting. One CSI process may be dedicated for Type 1 CSI reporting and another CSI process may be dedicated for Type 2 CSI reporting. If the measurement configuration is semi-static, a CSI process configuration may include a configuration of either Type 1 CSI reporting or Type 2 CSI reporting. Furthermore, a set of subframes for Type 2 channel measurement may be configured.

The triggering for Type 2 aperiodic CSI reporting is included in a DCI. A bit field in the DCI may indicate which CSI processes should be included in the UCI. If a triggered CSI process is for Type 2 aperiodic CSI reporting, the UE 104 may be required to include X numbers of Type 2 reports (X may be predefined or signaled by the RRC).

For CSI processes for Type 1 periodic CSI reporting, the periodicity and relative reporting offset for the subframe set 1 (S1) and the periodicity and relative reporting offset for subframe set 2 (S2) are configured. For CSI processes for Type 2 periodic CSI reporting, the periodicity and relative reporting offset is configured.

Figure 2:
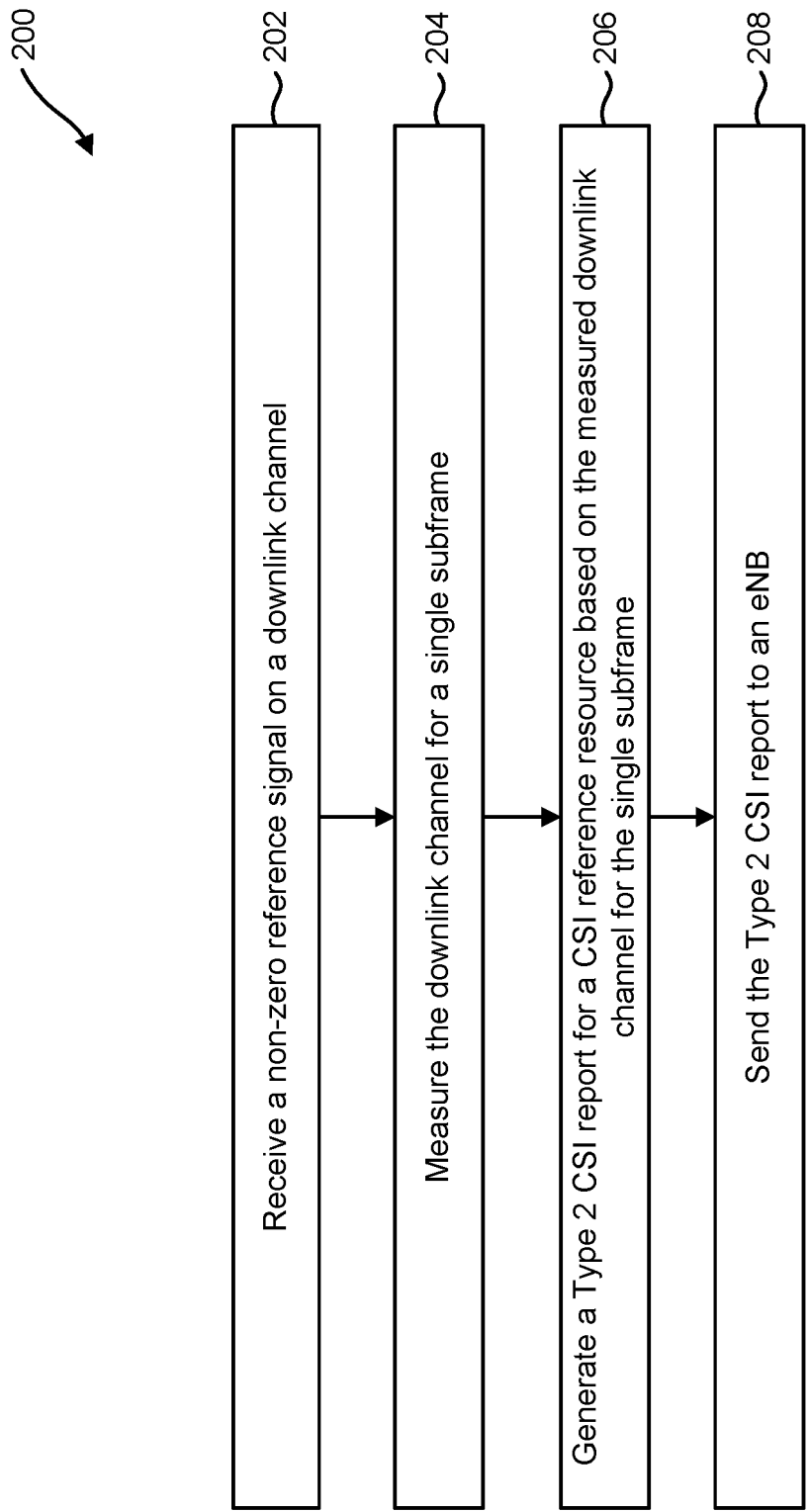
FIG. 2 is a flow diagram of a method for Type 2 measurement/reporting.

FIG. 2 is a flow diagram of a method 200 for Type 2 measurement/reporting. The method 200 may be performed by a UE 104. The UE 104 may receive 202 a non-zero reference signal on a downlink channel. The UE 104 may measure 204 the downlink channel for a single subframe. The UE 104 may then generate a Type 2 CSI report 122 for a CSI reference resource based on the measured downlink channel for the single subframe. The Type 2 CSI report 122 may be computed from a channel measurement based on a non-zero reference signal on a single subframe within a configured CSI-RS resource associated with a CSI process. The UE 104 may send 208 the Type 2 CSI report to an eNB 102.

Figure 3:
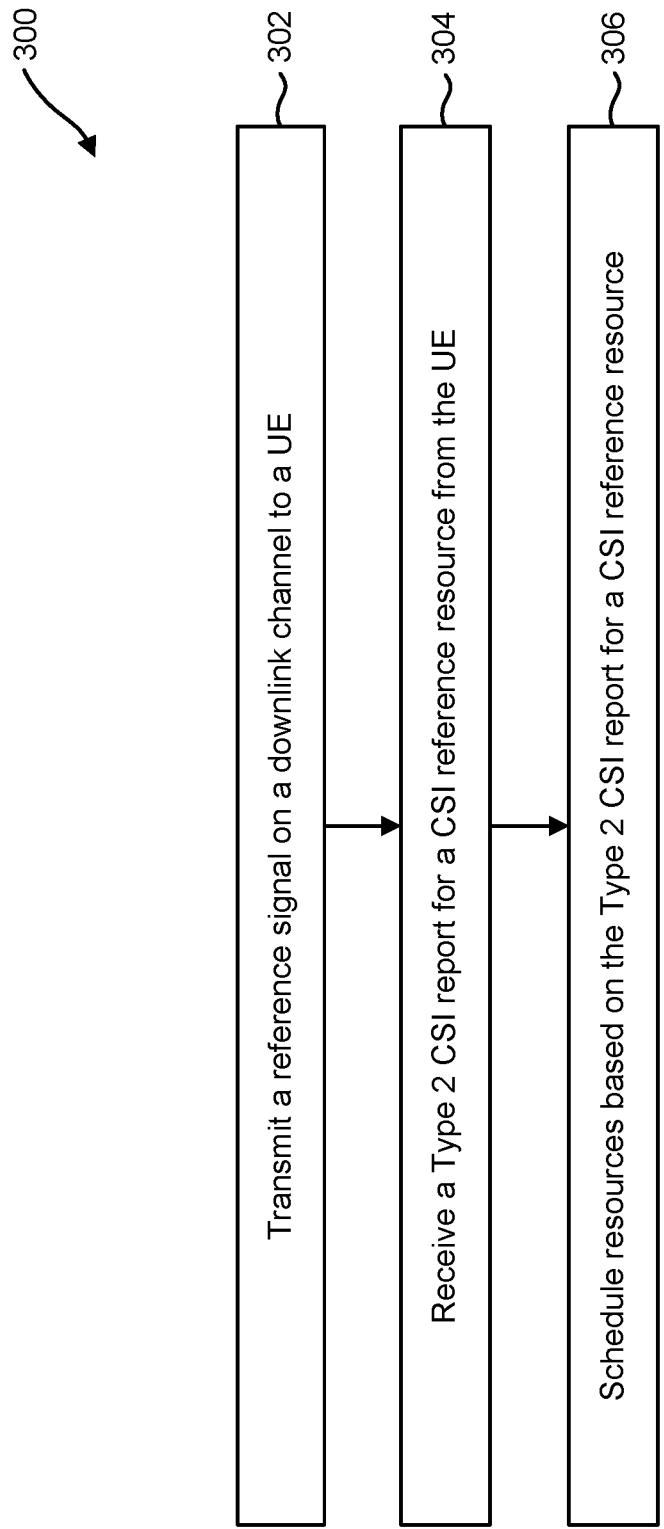
FIG. 3 is a flow diagram of another method for Type 2 measurement/reporting.

FIG. 3 is a flow diagram of another method 300 for Type 2 measurement/reporting. The method 300 may be performed by an eNB 102. The eNB 102 may transmit 302 a reference signal on a downlink channel to a UE 104. The eNB 102 may receive 304 a Type 2 CSI report 122 for a CSI reference resource from the UE 104. The Type 2 CSI report 122 may be computed from a channel measurement based on a non-zero power reference signal on a single subframe within a configured CSI-RS resource associated with a CSI process. The eNB 102 may schedule 306 resources based on the Type 2 CSI report 122 for a CSI reference resource.

Figure 4:
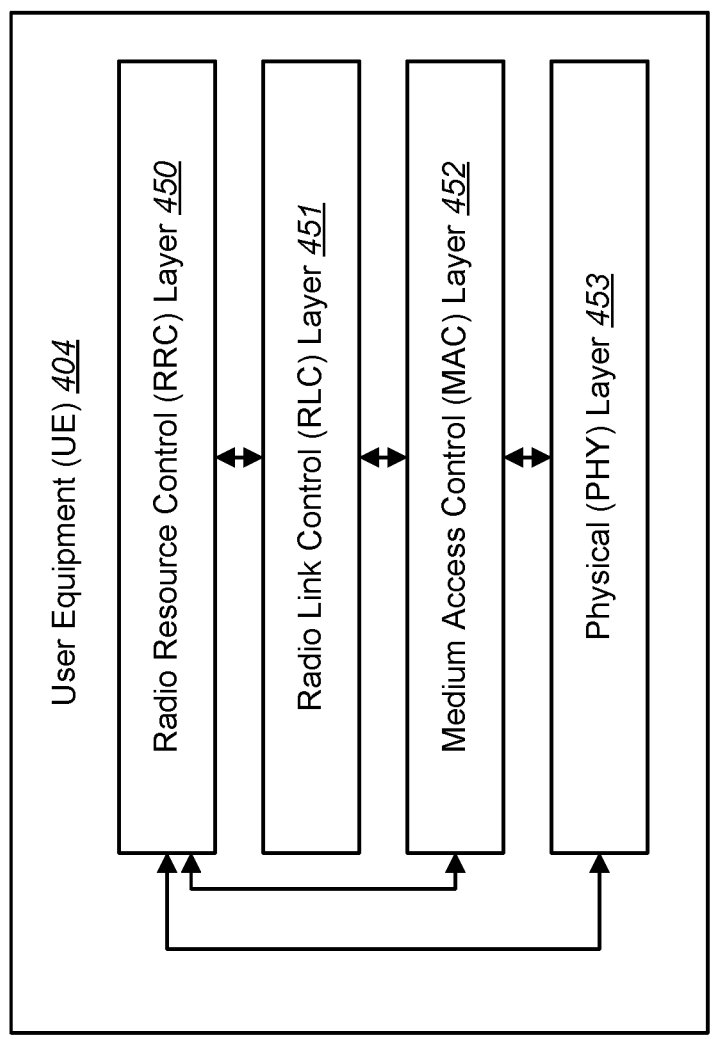
FIG. 4 is a block diagram illustrating the layers used by a user equipment (UE)

FIG. 4 is a block diagram illustrating the layers realized by a user equipment (UE) 404. The user equipment (UE) 404 of FIG. 4 may be one configuration of the user equipment (UE) 104 of FIG. 1. The user equipment (UE) 404 may include a radio resource control (RRC) layer 450, a radio link control (RLC) layer 451, a medium access control (MAC) layer 452 and a physical (PHY) layer 453. The RRC layer 450, RLC layer 451 and MAC layer 452 may be referred to as higher layers 118. Mainly the procedures described herein relate to the PHY layer 453. As used herein, the phrase "configured by higher layers" means that the PHY layer 453 is configured by the higher layer. The user equipment (UE) 404 may include additional layers not shown in FIG. 4.

Figure 5:
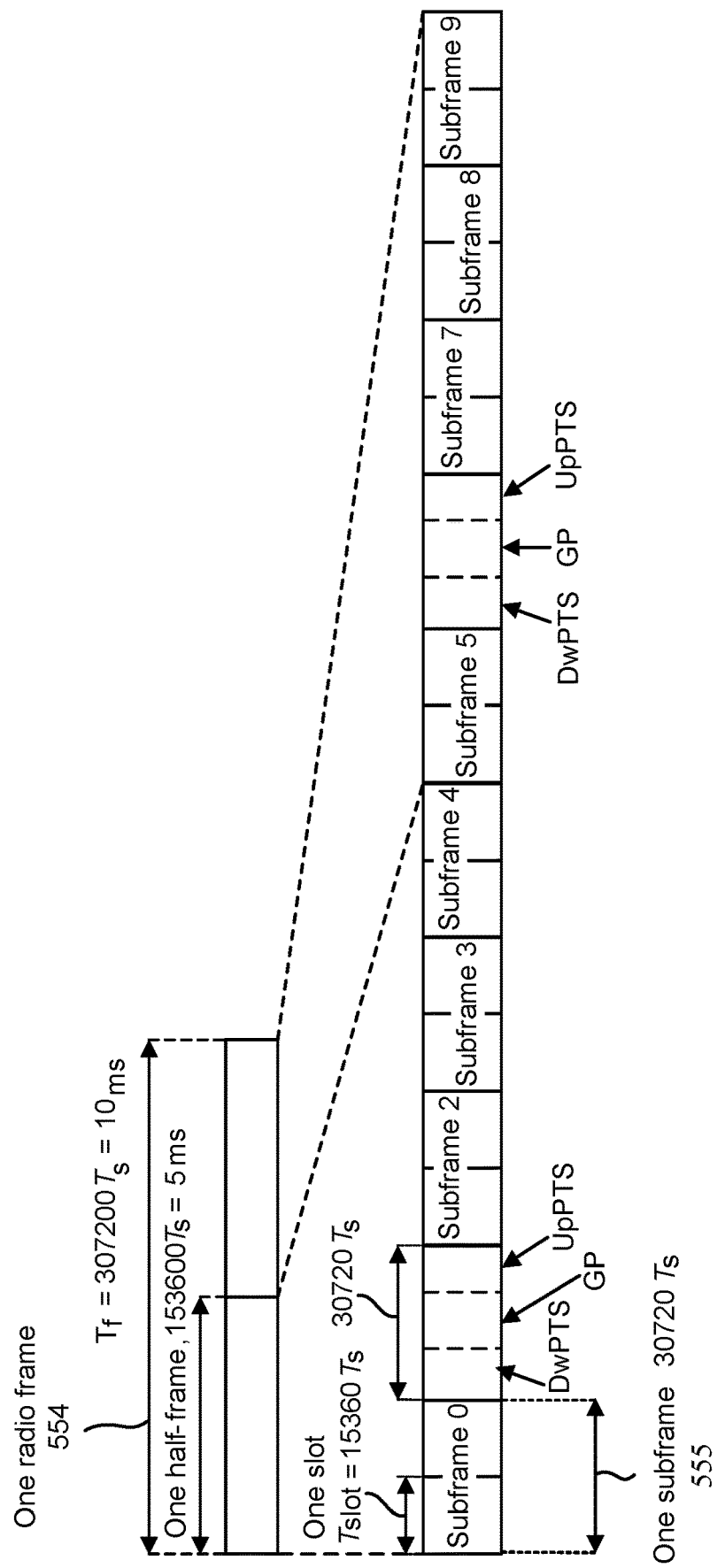
FIG. 5 illustrates the slot and subframe structure for Frame Structure Type 2.

FIG. 5 illustrates the slot and subframe structure for Frame Structure Type 2. Frame Structure Type 2 may be applicable to TDD. Each radio frame 554 of length $T_f = 307200 \cdot T_s = 10$ ms, includes two half-frames of length $153600 \cdot T_s = 5$ ms each. Each half-frame includes five subframes 555 of length $30720 \cdot T_s = 1$ ms. The Type 2 Frame Structure may be a downlink subframe 555, an uplink subframe 555 or a special subframe 555. The special subframe 555 may be preceded by a downlink subframe 555 and succeeded by an uplink subframe 555. The special subframe 555 may be divided into three parts: DwPTS, GP and UpPTS. DwPTS is the downlink part of the special subframe 555, GP is the guard period and UpPTS is the uplink part of the special subframe 555.

Figure 6:
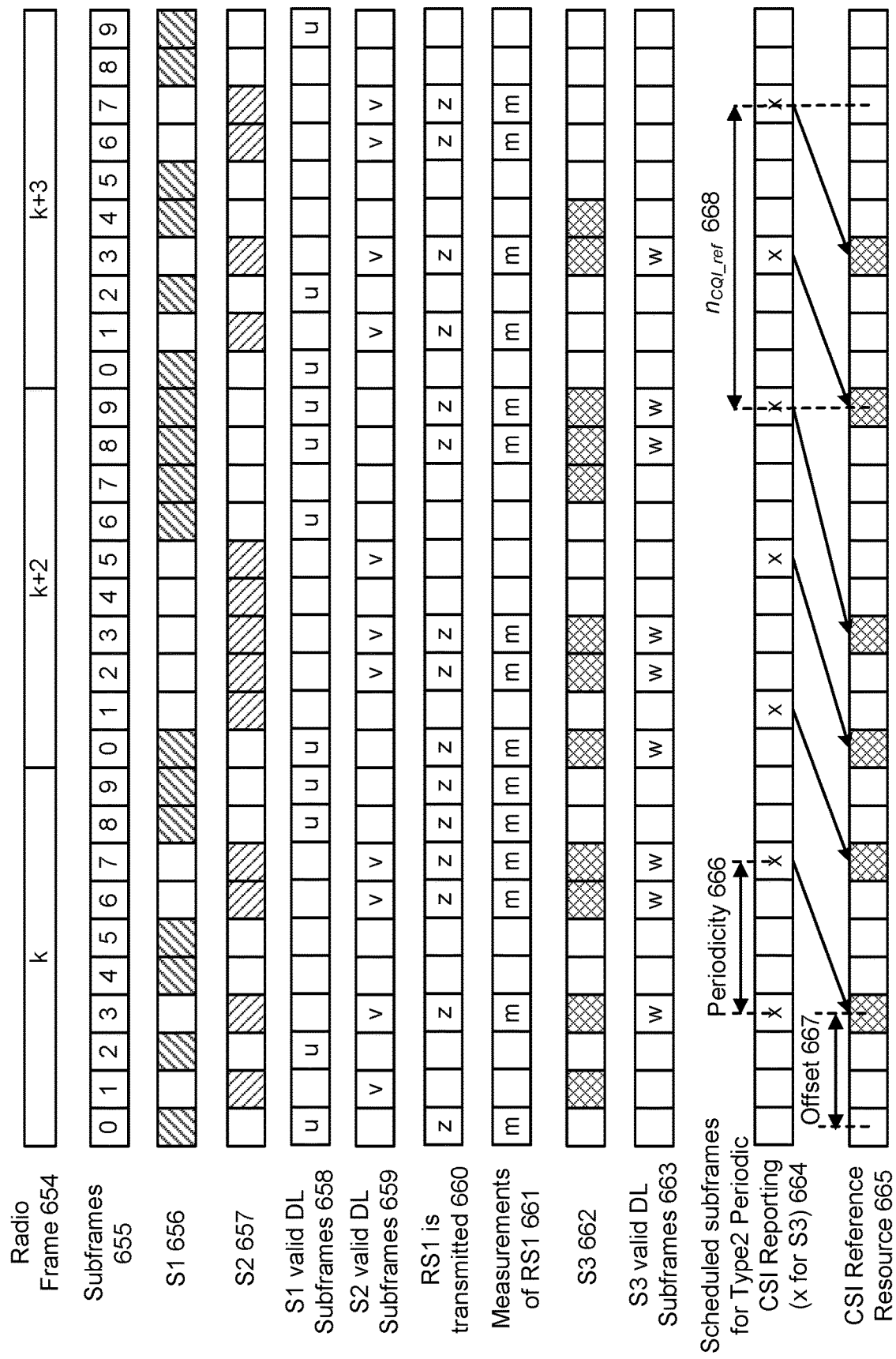
FIG. 6 illustrates the procedures for determining the CSI reference resources for periodic Type 2 CSI measurement/reporting.

FIG. 6 illustrates the procedures for determining the CSI reference resources for periodic Type 2 CSI measurement/reporting. The computation of PMI and RI of a CSI report may be linked to the value of the CQI. Multiple radio frames 654 are illustrated. Each radio frame includes 654 ten subframes 655, numbered from 0 to 9. The radio frame number may also be referred to as the System Frame Number (SFN).

In Release 10 and 11 of the 3GPP specification, a UE 104 is configured with two subframe sets for measuring CSI. The first subframe set $C_{CSI,0}$ is referred to as S1 656 herein. The second subframe set $C_{CSI,1}$ is referred to as S2 657 herein. For a UE 104 in transmission mode 10, one subframe 655 belongs to either S1 656 or S2 657 but not both. A dedicated RRC configuration can identify the set of subframes 655 for Type 2 channel measurement, which is referred to as S3 662. In one example, the UE 104 may assume that S3 662 is the same as the set of subframes 655 associated with the CSI-RS resources corresponding to the CSI process. In another example, the UE 104 is configured with S3 662 independent of the set of subframes 655 associated with the CSI-RS resources corresponding to the CSI process. A dedicated RRC configuration can identify the set of subframes 655 for Type 2 interference measurement, which is referred to as S4.

The valid downlink subframes 658 for S1 656 are illustrated. The valid downlink subframes 659 for S2 657 are also illustrated. The subframes 660 that the UE 104 is configured to receive a reference signal are labeled with 'z' and the observations/measurements 661 of the reference signal by the UE 104 are labeled m. The valid downlink subframes 663 for S3 662 are also illustrated.

The procedure for periodic reporting of Type 2 CSI reports is the same for cases when one CSI process is used for both Type 1 measurement/reporting and Type 2 measurement/reporting and for cases when a dedicated CSI process is used for either Type 1 CSI reporting or Type 2 CSI reporting. A dedicated RRC configuration may determine the periodicity 666 and relative reporting offset 667. For each reporting instance 664, the UE 104 may identify the corresponding CSI reference resource 665. The UE 104 may then generate the Type 2 periodic CSI report 122 based on the non-zero power CSI-RS corresponding to the CSI process in the CSI reference resource 665. The UE 104 may further include interference measurement when generating the Type 2 periodic CSI report 122 based on at least the configured resources for interference measurement in the CSI reference resource 665.

In the Figure, the UE 104 is configured for periodic reporting with a periodicity 666 of 4 ms (4 subframes 655, where each subframe 655 has a duration of 1 ms) and an offset of 3 subframes 655 (or 3 ms). For the periodic Type 2 CSI reporting scheduled in the uplink subframe 7 of radio frame k+3, the UE 104 identifies the CSI reference resource 665 for Type 2 CSI reporting to be the subframe 3 in radio frame k+3. The UE 104 generates the periodic Type 2 CSI report 122 for the CSI reference resource 665 (i.e., subframe 3 in radio frame k+3) based on the non-zero power CSI-RS and the CSI-RS resources corresponding to the CSI process in subframe 3 of radio frame k+3. The UE 104 may also include the interference measurement when generating the Type 2 periodic CSI report 122, based on at least the configured resources for interference measurement in subframe 3 of radio frame k+3.

For a UE 104 in transmission mode 10 or transmission mode 11 (or any transmission mode that enables Type 2 measurement), the UE 104 may derive the interference measurements for computing the CQI value reported in uplink subframe n and corresponding to a CSI process based on the interference measurement signal only on subframe n-delta within the configured CSI-IM resource associated with the CSI process. The subframe n-delta may be a CSI reference resource 665 subframe (i.e., subframe n-$n_{CQI\_ref}$). This interference measurement is referred to as a Type 2 interference measurement. The interference measurement signal may be a zero-power CSI-RS.

For a UE 104 in transmission mode 10 or transmission mode 11 (or any transmission mode that enables Type 2 measurement), the UE 104 may derive the channel measurement for computing the CQI value reported in uplink subframe n and corresponding to a CSI process based on only a non-zero power CSI-RS only on subframe n-delta within the configured CSI-RS resource associated with the CSI process. The subframe n-delta may be a CSI reference resource 665 subframe (i.e., subframe n-$n_{CQI\_ref}$). This channel measurement is referred to as a Type 2 channel measurement. A Type 2 CSI measurement may include a Type 2 channel measurement, a Type 2 interference measurement, or both.

For Type 1 and Type 2 periodic CSI reporting, $n_{CQI\_ref}$ is the smallest value greater than or equal to p, such that the subframe n-$n_{CQI\_ref}$ corresponds to a valid downlink subframe 665. For FDD, p=5. For TDD with up to three CSI processes, p=4. For TDD with more than three CSI processes, p=5.

In Type 1 channel measurement, a UE 104 may derive the channel measurement for computing the CQI value reported in uplink subframe n (and corresponding to a CSI process) based on only the non-zero power CSI-RS within a configured CSI-RS resource associated with the CSI process.

As used herein, Type 2 CSI reporting may be computed based on a) a combination of Type 1 channel measurement and Type 2 interference measurement, b) a combination of Type 2 channel measurement and Type 2 interference measurement or c) a combination of Type 2 channel measurement and Type 2 interference measurement. The valid downlink subframe 665 may be in a set of subframes 665 for a Type 1 interference measurement. The valid downlink subframe 665 may also be in a set of subframes 665 in which the CSI-IM resource is configured. Type 1 interference measurement is defined by the UE 104 deriving the interference measurements for computing the CQI value reported in uplink subframe n (corresponding to a CSI process) based on only the zero power CSI-RS within the configured CSI-IM resource associated with the CSI process. Unlike a Type 1 interference measurement, a Type 2 interference measurement may not be restricted to the zero power CSI-RS within the configured CSI-IM resource associated with the CSI process and may be based on the interference measurement signal only on subframe n-delta within the configured CSI-IM resource associated with the CSI process.

Figure 7:
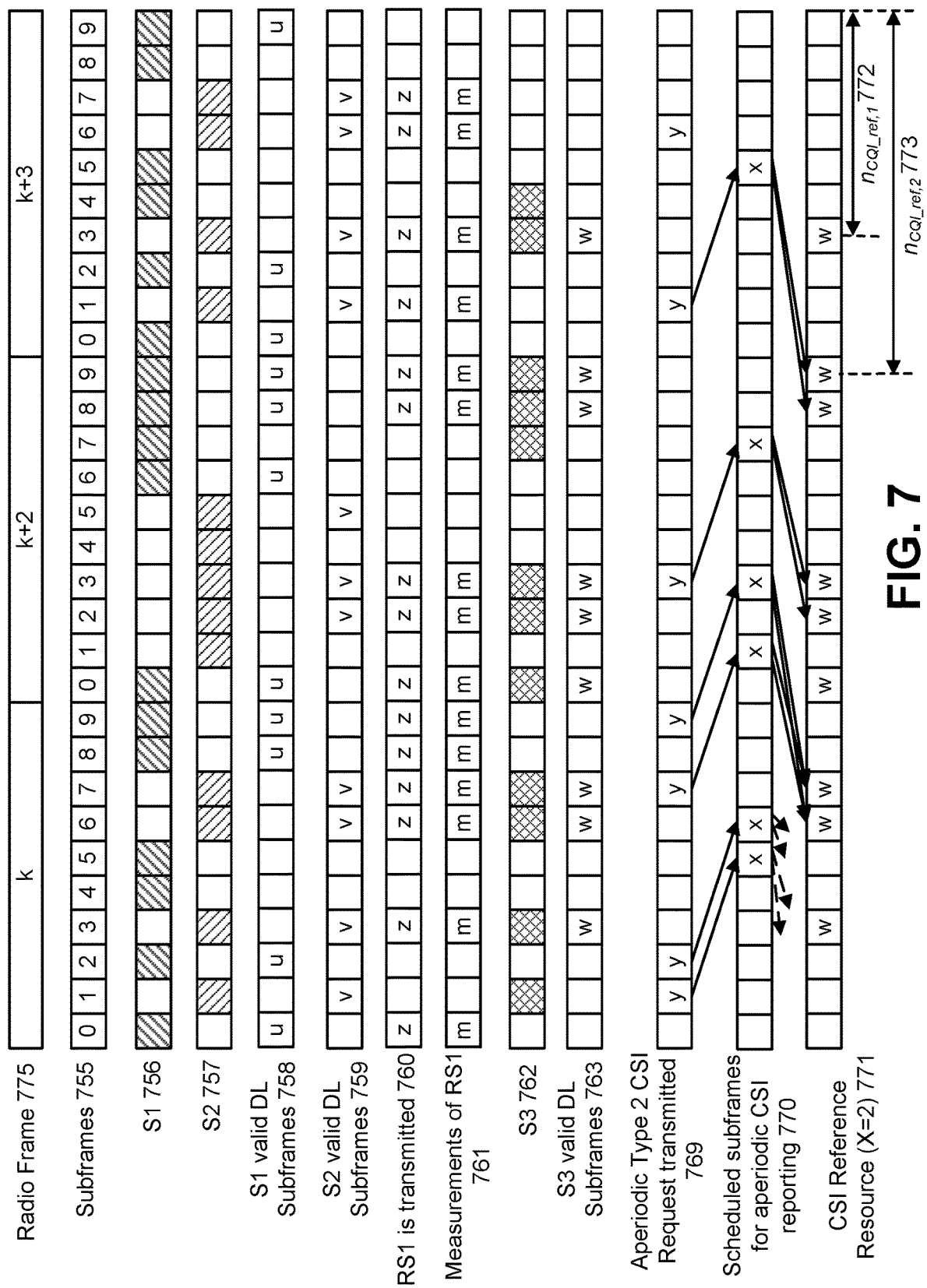
FIG. 7 illustrates the procedures for determining the CSI reference resources for aperiodic Type 2 CSI measurement/reporting.

FIG. 7 illustrates the procedures for determining the CSI reference resources for aperiodic Type 2 CSI measurement/reporting. Multiple radio frames 775 are illustrated. Each radio frame 775 may include ten subframes 755, numbered from 0 to 9. The subframe set S1 756, the subframe set S2 757 and the subframe set S3 762 are illustrated. Further, the valid downlink subframes 758 for S1 756, the valid downlink subframes 759 for S2 757 and the valid downlink subframes 763 for S3 are illustrated.

To trigger aperiodic CSI reporting, the eNB 102 sends an uplink DCI (e.g., DCI format 0 or 4) that includes a field requesting aperiodic CSI reporting. If one CSI process is used for both Type 1 CSI reporting and Type 2 CSI reporting, then the aperiodic CSI report may include only Type 1, only Type 2 or both Type 1 and Type 2 CSI reports. The CSI report may also include multiple Type 2 CSI reports. In one configuration, one bit may indicate whether the report includes Type 2 reports or not, as illustrated in Table 6 below.

TABLE 6

| Type Indicator Bit | Aperiodic Report Includes |
|---|---|
| 0 | Only Type 1 CSI reports |
| 1 | Both Type 1 and Type 2 CSI reports |

An additional one or two bits can be used to signal a collection of CSI reports as given in Table 3 above. It is also possible to not include the type indicator bit. Thus, the CSI request field of two bits may indicate sets of CSI reports including Type 1, Type 2 or both Type 1 and Type 2 CSI reports as illustrated in Table 7 below.

TABLE 7

| Value of CSI request field | Description |
|---|---|
| '00' | Aperiodic CSI report of Type 1 for a set of CSI process(es) configured by higher layers for serving cell |
| '01' | Aperiodic CSI reports of Type 1 and Type 2 is triggered for a set of CSI process(es) configured by higher layers for serving cell |
| '10' | Aperiodic CSI report is triggered for a 1$^{st}$ set of CSI process(es) configured by higher layers |
| '11' | Aperiodic CSI report of Type 2 for a set of CSI process(es) configured by higher layers for serving cell |

If a CSI process can be configured with only one CSI reporting type, then there is no need for the type indicator bit in the uplink DCI. In this case, the CSI request field in the uplink DCI can be used for identifying the aperiodic CSI reports as illustrated in Table 8 below.

TABLE 8

| Value of CSI request field | Description |
|---|---|
| '00' | No aperiodic CSI report is triggered |
| '01' | Aperiodic CSI report is triggered for a set of CSI process(es) configured by higher layers for serving cell |
| '10' | Aperiodic CSI report is triggered for a 1$^{st}$ set of CSI process(es) configured by higher layers |
| '11' | Aperiodic CSI report is triggered for a 2$^{nd}$ set of CSI process(es) configured by higher layers |

The number of Type 2 CSI reports in an aperiodic CSI report may be configured by dedicated RRC signaling.

The subframes 769 where an aperiodic Type 2 CSI request is transmitted are illustrated. The scheduled subframes 770 for aperiodic CSI reporting are also illustrated. The CSI reference resource subframes 771 are further illustrated. For aperiodic reporting with X number of Type 2 CSI reports 122 (i.e., r1, r2, r3, . . . rX) included in the UCI, $n_{CQI\_ref}$ is evaluated for each Type 2 CSI report 122. For report r1, $n_{CQI\_ref\_1}$ is the smallest value greater than or equal to p, such that subframe n-$n_{CQI\_ref\_1}$ corresponds to a valid downlink subframe 763, with the above candidates for p. Likewise, for report r2, $n_{CQI\_ref\_2}$ is the smallest value greater than or equal to $n_{CQI\_ref\_1}$, such that subframe n-$n_{CQI\_ref\_2}$ corresponds to a valid downlink subframe 763. The ith report (i.e., ri), 1<i≤X, denoted by $n_{CQI\_ref\_i}$, is the smallest value greater than $n_{CQI\_ref\_i-1}$ such that subframe n-$n_{CQI\_ref\_i}$ corresponds to a valid downlink subframe 763.

A downlink subframe 755 is considered to be valid if a) the downlink subframe 755 is configured as a downlink subframe 755 for that UE 104, b) except for transmission mode 9 or 10, the downlink subframe 755 is not an MBSFN subframe (discussed below), c) the downlink subframe 755 does not include a DwPTS field in cases where the length of DwPTS is 7680·$T_s$ and less, d) the downlink subframe 755 does not fall within a configured measurement gap for that UE 104, and e) specific parameters for Type 1 CSI reporting and Type 2 CSI reporting are met. For Type 1 periodic CSI reporting, the additional specific parameters required are that a downlink subframe 755 is considered to be valid if the downlink subframe 755 is an element of the CSI subframe set linked to the periodic CSI report when that UE 104 is configured with CSI subframe sets.

In a multimedia broadcast/multicast service (MBMS) network, the same content may be transmitted simultaneously in a specific area (referred to as an MBMS service area) which may geographically include multiple transmission points (TPs) or eNBs 102. If the transmissions of all transmission points (TPs) are time synchronized, from the perspective of a UE 104, the transmissions appear to originate from a single transmission point (TP). This transmission is referred to as a MBMBS single-frequency network (MBSFN).

For Type 2 periodic and aperiodic CSI reporting, the additional specific criteria required (for a subframe 755 to be considered a valid downlink subframe 755) are a) that the downlink subframe 755 is in the set of subframes 755 for Type 2 channel measurement (i.e., S3 762), b) the downlink subframe 755 is in the set of subframes 755 in which the reference signal (e.g., the CSI-RS resource associated with the CSI process) is configured, c) the downlink subframe 755 is in the set of subframes 755 for Type 2 channel measurement if the set of subframes 755 for Type 2 channel measurement is configured, d) the downlink subframe 755 is in the set of subframes 755 for a Type 2 interference measurement (i.e., the subset S4 which is similar to the subset S3 762) or e) the downlink subframe 755 is in the set of subframes 755 in which the CSI-IM resource is configured.

Depending on the method for computing a Type 2 CSI report (e.g., based on a Type 1 channel measurement and a Type 2 interference measurement, based on a Type 2 channel measurement and a Type 2 interference measurement, or based on a Type 2 channel measurement and a Type 1 interference measurement), a combination of the above criteria might be applied for determining a valid downlink subframe 755.

As an example, the UE 104 may receive an uplink DCI with an aperiodic CSI reporting request in subframe 1 of radio frame k+3. The PUSCH resources are scheduled for a transmission of an aperiodic CSI report in subframe 6 of radio frame k+3. Moreover, the UE 104 is configured by RRC signaling to include two Type 2 CSI reports 122 in the aperiodic CSI reporting. The UE 104 may identify the CSI reference resource 771 for the first Type 2 CSI report 122 (which is subframe 8 of radio frame k+2) and the second CSI reference resource 771 for the second Type 2 CSI report 122 (which is subframe 9 of radio frame k+2) (e.g., based on $n_{CQI\_ref}$ and the valid downlink subframe 775 definition described above).

The UE 104 may generate a first Type 2 CSI report 122 based on the non-zero power CSI-RS within the configured CSI-RS resource corresponding to the CSI process in subframe 8 of radio frame k+2. The UE 102 may further include interference measurements when generating the first Type 2 CSI report 122, based on at least the configured resources for interference measurement in subframe 8 of radio frame k+2. The UE 104 may also generate a second Type 2 CSI report 122 based on the non-zero power CSI-RS within the configured CSI-RS resource corresponding to the CSI process in subframe 9 of radio frame k+2. The UE 104 may include interference measurements when generating the second Type 2 CSI report 122, based on at least the configured resources for interference measurement in subframe 9 of radio frame k+2. For this example, a combination of Type 2 channel measurement and Type 1 interference measurement is used. However, a similar method may also be applied to a combination of Type 1 channel measurement and Type 2 interference measurement by replacing the valid downlink subframe 763 for S3 762 with a valid downlink subframe for S4 (not shown). The UE 104 may generate a first Type 2 CSI report 122 based on the CSI-IM resources corresponding to the CSI process in subframe 8 of radio frame k+2. The UE 104 may also generate a second Type 2 CSI report 122 based on the CSI-IM corresponding to the CSI process in subframe 9 of radio frame k+2. Also, a similar method may be applied using a combination of Type 2 channel measurement and Type 2 interference measurement on a CSI reference resource that is a valid downlink subframe 755 considering the criteria related to both channel measurement and interference measurements.

Figure 8:
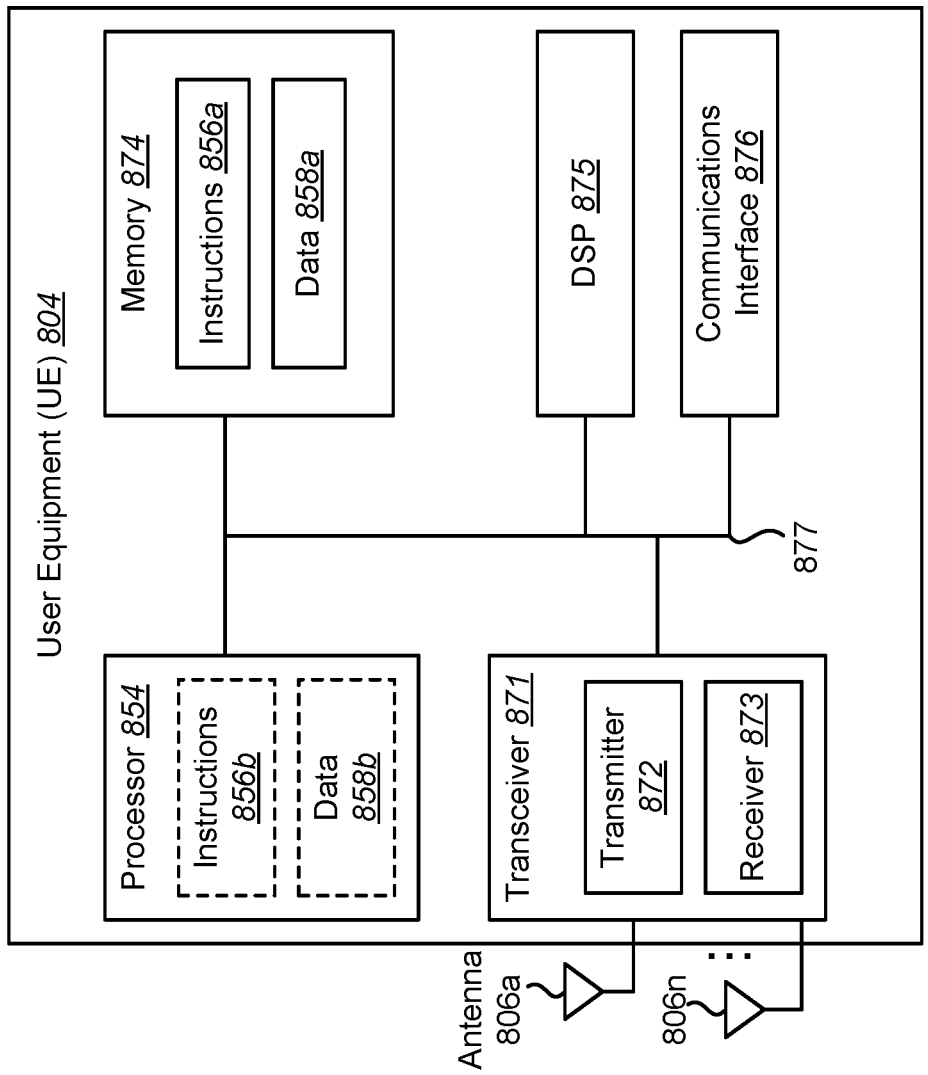
FIG. 8 illustrates various components that may be utilized in a user equipment (UE)

FIG. 8 illustrates various components that may be utilized in a user equipment (UE) 804. The user equipment (UE) 804 may be utilized as the user equipment (UE) 104 illustrated previously. The user equipment (UE) 804 includes a processor 854 that controls operation of the user equipment (UE) 804. The processor 854 may also be referred to as a CPU. Memory 874, which may include both read-only memory (ROM), random access memory (RAM) or any type of device that may store information, provides instructions 856a and data 858a to the processor 854. A portion of the memory 874 may also include non-volatile random access memory (NVRAM). Instructions 856b and data 858b may also reside in the processor 854. Instructions 856b and/or data 858b loaded into the processor 854 may also include instructions 856a and/or data 858a from memory 874 that were loaded for execution or processing by the processor 854. The instructions 856b may be executed by the processor 854 to implement the systems and methods disclosed herein.

The user equipment (UE) 804 may also include a housing that includes a transmitter 872 and a receiver 873 to allow transmission and reception of data. The transmitter 872 and receiver 873 may be combined into a transceiver 871. One or more antennas 806a-n are attached to the housing and electrically coupled to the transceiver 871. An antenna port may be realized by one or more antennas.

The various components of the user equipment (UE) 804 are coupled by a bus system 877, which may include a power bus, a control signal bus, and a status signal bus, in addition to a data bus. However, for the sake of clarity, the various buses are illustrated in FIG. 8 as the bus system 877. The user equipment (UE) 804 may also include a digital signal processor (DSP) 875 for use in processing signals. The user equipment (UE) 804 may also include a communications interface 876 that provides user access to the functions of the user equipment (UE) 804. The user equipment (UE) 804 illustrated in FIG. 8 is a functional block diagram rather than a listing of specific components.

Figure 9:
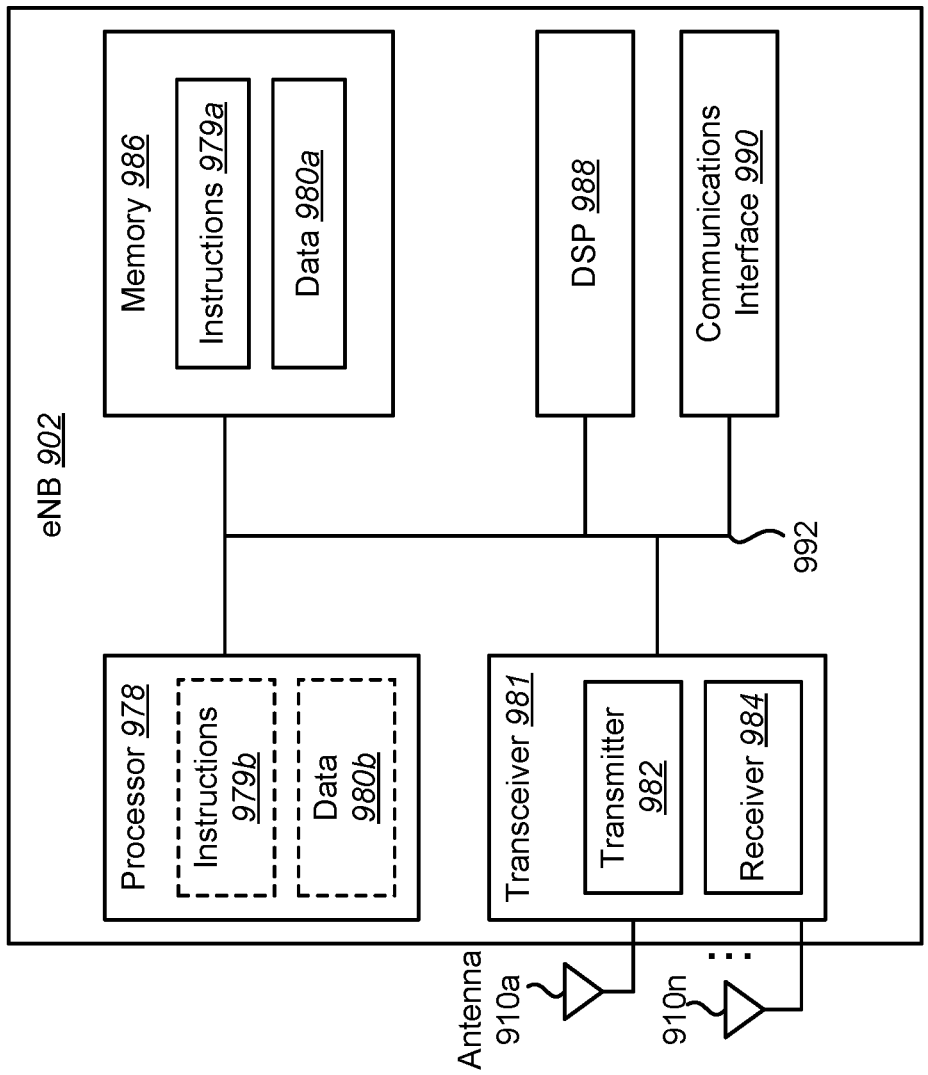
FIG. 9 illustrates various components that may be utilized in an eNB.

FIG. 9 illustrates various components that may be utilized in an eNB 902. The eNB 902 may be utilized as the eNode B 102 illustrated previously. The eNB 902 may include components that are similar to the components discussed above in relation to the user equipment (UE) 804, including a processor 978, memory 986 that provides instructions 979a and data 980a to the processor 978, instructions 979b and data 980b that may reside in or be loaded into the processor 978, a housing that includes a transmitter 982 and a receiver 984 (which may be combined into a transceiver 981) one or more antenna ports 908a-n electrically coupled to the transceiver 981, a bus system 992, a DSP 988 for use in processing signals, a communications interface 990, antennas 910a-n and so forth.

Unless otherwise noted, the use of '/' above represents the phrase "and/or."

The functions described herein may be implemented in hardware, software, firmware or any combination thereof. If implemented in software, the functions may be stored as one or more instructions on a computer-readable medium. The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

As used herein, the term "determining" encompasses a wide variety of actions and, therefore, "determining" can include calculating, computing, processing, deriving, investigating, looking up (e.g., looking up in a table, a database or another data structure), ascertaining and the like. In addition, "determining" can include receiving (e.g., receiving information), accessing (e.g., accessing data in a memory) and the like. Also, "determining" can include resolving, selecting, choosing, establishing and the like.

The phrase "based on" does not mean, "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

Software or instructions may also be transmitted over a transmission medium. For example, if the software is transmitted from a website, server, or other remote source using a coaxial cable, fiber optic cable, twisted pair, digital subscriber line (DSL) or wireless technologies such as infrared, radio, and microwave, then the coaxial cable, fiber optic cable, twisted pair, DSL, or wireless technologies such as infrared, radio and microwave are included in the definition of transmission medium.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for receiving uplink control information (UCI), comprising:
   receiving a second Channel State Information (CSI) report from a user equipment (UE),
   the second CSI report being computed from interference measurements that are derived only on a single subframe within a configured CSI-interference measurement (CSI-IM) resource, the single subframe being determined based on a CSI reference resource and the configured CSI-IM resource,
   a first CSI report being computed from interference measurements based on an observation interval which is unrestricted in time and frequency,
   the CSI reference resource referred to for the second CSI report reported in an uplink subframe being defined by a valid downlink subframe which precedes the uplink subframe by a specific number of subframes.

2. The method of claim 1, wherein the second CSI report is a periodic CSI report.

3. The method of claim 1, wherein the second CSI report is configured in a CSI process configuration.

4. The method of claim 1, wherein the second CSI report is an aperiodic CSI report.

5. The method of claim 1, wherein the second CSI report corresponds to a configured CSI process.

6. A method for reporting uplink control information (UCI), comprising:
computing a first Channel State Information (CSI) report from interference measurements based on an observation interval which is unrestricted in time and frequency;
computing a second CSI report from interference measurements that are derived only on a single subframe within a configured CSI-interference measurement (CSI-IM) resource, the single subframe being determined based on a CSI reference resource and the configured CSI-IM resource; and
transmitting the second CSI report,
the CSI reference resource referred to for the second CSI report reported in an uplink subframe being defined by a valid downlink subframe which precedes the uplink subframe by a specific number of subframes.

7. The method of claim 6, wherein the second CSI report is a periodic CSI report.

8. The method of claim 6, wherein the second CSI report is configured in a CSI process configuration.

9. The method of claim 6, wherein the second CSI report is an aperiodic CSI report.

10. The method of claim 6, wherein the second CSI report corresponds to a configured CSI process.

11. A base station configured for receiving uplink control information (UCI), comprising:
a processor;
memory in electronic communication with the processor; and
instructions stored in the memory, the instructions being executable to:
receive a second Channel State Information (CSI) report from a user equipment (UE),
the second CSI report being computed from interference measurements that are derived only on a single subframe within a configured CSI-interference measurement (CSI-IM) resource, the single subframe being determined based on a CSI reference resource and the configured CSI-IM resource,
a first CSI report being computed from interference measurements based on an observation interval which is unrestricted in time and frequency,
the CSI reference resource referred to for the second CSI report reported in an uplink subframe being defined by a valid downlink subframe which precedes the uplink subframe by a specific number of subframes.

12. The base station of claim 11, wherein the second CSI report is a periodic CSI report.

13. The base station of claim 11, wherein the second CSI report is configured in a CSI process configuration.

14. The base station of claim 11, wherein the second CSI report is an aperiodic CSI report.

15. The base station of claim 11, wherein the second CSI report corresponds to a configured CSI process.

16. A user equipment (UE) configured for reporting uplink control information (UCI), comprising:
a processor;
memory in electronic communication with the processor; and
instructions stored in the memory, the instructions being executable to:
compute a first Channel State Information (CSI) report from interference measurements based on an observation interval which is unrestricted in time and frequency;
compute a second CSI report from interference measurements that are derived only on a single subframe within a configured CSI-interference measurement (CSI-IM) resource, the single subframe being determined based on a CSI reference resource and the configured CSI-IM resource; and
transmit the second CSI report,
the CSI reference resource referred to for the second CSI report reported in an uplink subframe being defined by a valid downlink subframe which precedes the uplink subframe by a specific number of subframes.

17. The UE of claim 16, wherein the second CSI report is a periodic CSI report.

18. The UE of claim 16, wherein the second CSI report is configured in a CSI process configuration.

19. The UE of claim 16, wherein the second CSI report is an aperiodic CSI report.

20. The UE of claim 16, wherein the second CSI report corresponds to a configured CSI process.

* * * * *